United States Patent
Soni et al.

(10) Patent No.: US 11,201,754 B2
(45) Date of Patent: *Dec. 14, 2021

(54) SYNCHRONIZED ACCESSIBILITY FOR CLIENT DEVICES IN AN ONLINE CONFERENCE COLLABORATION

(71) Applicant: Adobe Inc., San Jose, CA (US)

(72) Inventors: Sachin Soni, New Delhi (IN); Ajay Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/592,485

(22) Filed: Oct. 3, 2019

(65) Prior Publication Data

US 2020/0036546 A1    Jan. 30, 2020

Related U.S. Application Data

(63) Continuation of application No. 15/673,112, filed on Aug. 9, 2017, now Pat. No. 10,439,835.

(51) Int. Cl.
| | |
|---|---|
| *H04L 12/18* | (2006.01) |
| *H04N 7/15* | (2006.01) |
| *G09B 21/00* | (2006.01) |
| *H04N 7/14* | (2006.01) |

(52) U.S. Cl.
CPC ........ *H04L 12/1827* (2013.01); *G09B 21/009* (2013.01); *H04N 7/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 9,621,851 B2 | 4/2017 | Sanso | |
| 10,439,835 B2 | 10/2019 | Soni et al. | |
| 2011/0268418 A1* | 11/2011 | Jones | H04M 3/42221 386/200 |

(Continued)

OTHER PUBLICATIONS

"First Action Interview Office Action", U.S. Appl. No. 15/673,112, filed May 3, 2019, 3 pages.

(Continued)

*Primary Examiner* — Ranodhi Serrao
(74) *Attorney, Agent, or Firm* — FIG. 1 Patents

(57) ABSTRACT

Techniques and systems for synchronized accessibility for client devices in an online conference are described. For example, a conferencing system receives presentation content and audio content as part of the online conference from a client device. The conferencing system generates sign language content by converting audio in the audio content to sign language. The conferencing system then synchronizes display of the sign language content with the presentation content in a user interface based on differences in durations of segments of the audio content from durations of corresponding segments of the sign language content. Then, the conferencing system outputs the sign language content as synchronized with the presentation content, such as to a viewer client device that requested the sign language content, or to storage for later access by viewers that request sign language content.

20 Claims, 7 Drawing Sheets

(56) References Cited

U.S. PATENT DOCUMENTS

| | | | | |
|---|---|---|---|---|
| 2011/0270922 A1* | 11/2011 | Jones | ............... | H04L 65/1093 |
| | | | | 709/204 |
| 2011/0270923 A1* | 11/2011 | Jones | ............... | G06F 3/0486 |
| | | | | 709/204 |
| 2011/0270933 A1* | 11/2011 | Jones | ............... | H04L 12/1822 |
| | | | | 709/206 |
| 2011/0271192 A1* | 11/2011 | Jones | ............... | H04N 7/15 |
| | | | | 715/727 |
| 2011/0271197 A1* | 11/2011 | Jones | ............... | H04L 12/1822 |
| | | | | 715/739 |
| 2011/0271207 A1* | 11/2011 | Jones | ............... | H04W 4/023 |
| | | | | 715/753 |
| 2011/0271209 A1* | 11/2011 | Jones | ............... | H04L 67/36 |
| | | | | 715/753 |
| 2011/0271210 A1* | 11/2011 | Jones | ............... | H04L 67/36 |
| | | | | 715/753 |
| 2011/0271332 A1* | 11/2011 | Jones | ............... | H04L 9/3247 |
| | | | | 726/7 |
| 2013/0231930 A1 | 9/2013 | Sanso | | |
| 2014/0046661 A1* | 2/2014 | Bruner | ............... | G06F 40/56 |
| | | | | 704/235 |
| 2016/0147741 A1 | 5/2016 | Dawar et al. | | |
| 2019/0052473 A1 | 2/2019 | Soni et al. | | |

OTHER PUBLICATIONS

"Notice of Allowance", U.S. Appl. No. 15/673,112, filed May 30, 2019, 14 pages.

"Pre-Interview First Office Action", U.S. Appl. No. 15/673,112, filed Mar. 22, 2019, 3 pages.

\* cited by examiner

SYNCHRONIZED ACCESSIBILITY FOR
CLIENT DEVICES IN AN ONLINE
CONFERENCE COLLABORATION

CROSS REFERENCE

This application claims priority under 35 U.S.C. Section 120 as a continuation of U.S. patent application Ser. No. 15/673,112, filed Aug. 9, 2017, and titled "Synchronized Accessibility for Client Devices in an Online Conference Collaboration", the entire disclosure of which is hereby incorporated by reference.

BACKGROUND

Online conferences including web conferencing, online meetings, webinars, and so forth are implemented to provide an immersive and interactive experience to participants via corresponding client devices via a network. Online conferences allow people across the world to collaborate using a variety of different types of media content (i.e., audio, digital images, video, software demonstrations, and so forth). Oftentimes, however, participants in online conferences have a disability that makes consumption of different media content items difficult, especially at real-time speeds. For example, current online conference systems do not provide adequate accessibility options for viewers who have a hearing impairment and cannot hear a presenter of the online conference, especially in real-time online conferences. Consequently, viewers of online conferences with disabilities miss out on consuming important online conference content.

SUMMARY

Techniques and systems are described to enable viewers of an online conference to access synchronized accessibility options during the online conference. For example, a conferencing system receives presentation content, such as a slideshow, a video, a screen share, a software demonstration, and so forth as part of the online conference from a client device. The conferencing system also receives audio content such as a live or pre-recorded audio stream of the presenter of the online conference from the client device. The conferencing system generates sign language content by converting audio in the audio content to sign language. The sign language content may include an animated character, or avatar, that presents the audio content in sign language in real time, for instance. The conferencing system then synchronizes display of the sign language content with the presentation content in a user interface based on differences in durations of segments of the audio content from durations of corresponding segments of the sign language content. For example, the conferencing system aligns the presentation content with the sign language content using a time stamp from the presentation content aligned with a time stamp from the audio content assigned to the corresponding sign language content.

Because segments of the sign language content may be different durations than segments of the original presentation content and audio content, different techniques may be used to align the presentation content with the sign language content, such as presenting a visual warning to the presenter of the online conference to slow down, or adding a delay to the presentation content as necessary to align the sign language content with the corresponding presentation content. Then, the conferencing system outputs the sign language content as synchronized with the presentation content, such as to a viewer client device that requested the sign language content, or to storage for later access by viewers that request sign language content. In this way, participants of online conferences can view the online conference with sign language content synchronized with a presentation without losing any of the online conference content or experience.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
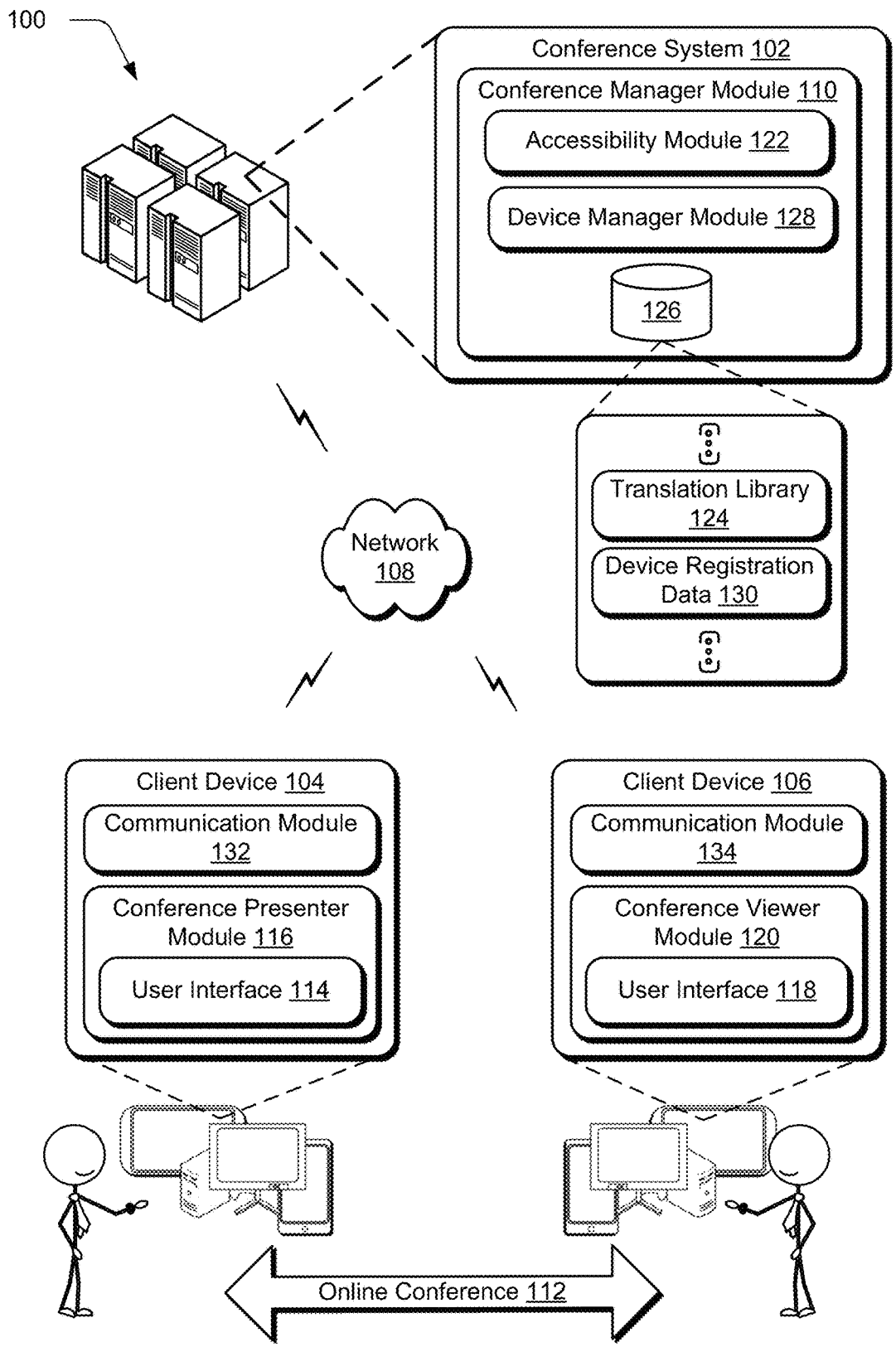
FIG. 1 is an illustration of an environment in an example implementation that is operable to employ techniques for synchronized accessibility in an online conference collaboration described herein.

Online conferences are becoming increasingly popular to disseminate information between remote participants. One of the benefits of online conferences is that many different types of information can be shared between remote participants, even simultaneously. For example, an online conference may present a slideshow, a live video feed of a presenter, live audio of the presenter, a chat box between the online conference participants, and profile pictures of the conference participants all in a single user interface. However, conventional conference systems often do not provide accessibility options for people with disabilities. For instance, conventional conference systems do not provide a person with a hearing impairment with acceptable ways to consume the content of an online conference, especially in real time.

Particularly, transcriptions of audio content, such as to sign language, often have a delay following the stream of audio in order to interpret the audio content and generate the translation. In an online conference scenario, this transcription delay causes the content of the audio stream of the online conference to be misaligned from the other content displayed in the online conference user interface. In fact, many conventional conference systems do not provide sign language transcriptions until after an online conference is complete, and the entire online conference is delivered to a remote source for translation services. Online conference participants with disabilities using conventional conference systems are left without a way to consume the entire experience of an online conference.

Accordingly, techniques and systems are described in which a conference system is configured to synchronize sign language content with online conference presentation content to provide accessibility of the online conference to online conference participants. The conference system, for instance, may be configured to support an interactive experience between client devices in a variety of different ways. Examples of which include use as part of an online application (via a subscription-based service system), provide opportunities to purchase a good or service, online storage, or other web service that is accessible via a network. The conference may include a variety of different content that may be communicated and stored digitally or electronically, e.g., movies, books, documents, games, applications, images, audio files, and so on.

To begin, the conference system receives presentation content and audio content as part of the online conference from a client device. In one example, the presentation content is one or more streams of visual content, such as a video of a presenter of the online conference, video related to subject matter of the online conference, a slideshow, a software demonstration, a screen share, and so forth. The audio content is one or more streams of audio such as a presenter's voice, audio associated with a video related to subject matter of the online conference, audio associated with a slideshow or software demonstration, and so forth. The online conference provides an interactive experience between multiple client devices to share the presentation content and the audio content, which may occur in real time. Alternatively or additionally, the online conference is provided for subsequent consumption by users after the online conference has concluded (e.g., as a Webinar).

In addition to the presentation content and audio content described above, the online conference can support different types of user interaction to provide an immersive experience for participants, such as a note portion (e.g., notes to be shared by a presenter), a share portion (e.g., documents, spread sheets, or other digital content shared with other attendees), a chat portion (e.g., to communicate with all or one particular attendee within the online conference), a poll portion (e.g., to poll attendees of the conference), a notepad portion (e.g., to retain notes personal to particular attendees of the online conference), or an attendee portion to list "who" is attending the online conference.

After receiving the presentation content and the audio content, the conference system generates sign language content by converting audio in the audio content to sign language. For example, the conference system includes a library of words in a language of the presenter of the online conference, along with translations of the words in the library to sign language. The conference system translates words in the received audio content to sign language using the library, and generates the sign language content using the translation, such as by causing an avatar to execute the sign language content. Consequently, the conference system generates a stream of visual sign language content that corresponds to the received audio content of the online conference.

Oftentimes, a duration of time to sign a word or phrase is different than a duration of time to speak the word or phrase. Over a prolonged online conference, the difference in durations to sign multiple words or phrases compared to the durations to speak the words or phrases can become amplified. In conventional systems, this can lead to significant differences between the presentation content that is currently being displayed in the online conference and the sign language content being displayed that represents the audio content for the online conference.

For instance, a presenter may be displaying a slideshow presentation as part of an online conference, and speaking to describe additional details not displayed on a slide, or answer questions from online conference participants about the slide. The presenter may conclude her description of the slide and move onto the next slide, continuing to describe the following slide's content. However, the sign language content of a conventional system may not keep pace with the presenter's audio in describing the first slide. When the presenter moves to the next slide, a user interface of a conventional online conference may still be displaying the sign language content from the previous slide. As the presenter moves through her presentation, the time difference between her audio content and the sign language content may continue to expand, causing confusion and frustration for sign language content recipients.

On the other hand, the conference system described herein synchronizes the sign language content with the presentation content based on differences in durations of segments of the audio content from durations of corresponding segments of the sign language content. In an example, the conference system utilizes time stamps associated with the audio content, the presentation content, and the sign language content to synchronize the sign language content with the presentation content. To do so, the conference system matches a time stamp from the presentation content with a word, phrase, or other segment of the sign language content based on a time stamp from the audio content that corresponds to both the sign language content and the presentation content. The conference system may add a delay to the presentation content, pause the presentation content, provide a notification to the presenter to slow down to accommodate the generation of the sign language content, and so forth in order to accommodate the different durations between the sign language content and the presentation content.

The conference system then outputs the sign language content as synchronized with the presentation content. Outputting the sign language content as synchronized with the presentation content can include outputting the presentation content and sign language content to a client device in real time, outputting the presentation content and sign language content to cloud storage for later consumption by client devices, and so on. Consider again the online conference example that includes slides as presentation content and a presenter speaking to provide audio content. Using the conference system described herein, a participant who requested sign language content as part of the online conference will receive a package of synchronized content that includes a slide shown at a specific moment, audio spoken at the specific moment, and the corresponding sign language generated by translating the audio spoken at the specific moment. Particularly, the sign language is presented to the participant at the same specific moment that corresponds to the slide, just as another participant would hear the presenter speak with the corresponding slide.

The described techniques for providing synchronized accessibility for client devices in an online conference collaboration help participants with physical disabilities consume online conference content in an easy and immersive way. Furthermore, the described techniques provide online conferences that comply with Section 508 guidelines, the Americans with Disabilities Act (ADA), and other regional and country-specific regulations without the cost and inconvenience of hiring an in-person sign language interpreter for each online conference. Accordingly, both consumption of online conferences for persons with physical disabilities, along with the production of online conferences for a wide range of participants, is greatly simplified with a seamless, accessible experience for all participants.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ online conference techniques described herein. The illustrated environment 100 includes a conference system 102 and client devices 104, 106, that are communicatively coupled, one to another, via a network 108. Computing devices that implement the conference system 102 and client devices 104, 106 may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a single computing device may be representative of several different devices, such as multiple servers utilized by a business to perform operations "over the cloud" as described in FIG. 7.

The conference system 102 includes a conference manager module 110. The conference manager module 110 is implemented at least partially in hardware of a computing device (e.g., processing system and computer-readable storage media) to manage an online conference 112 between the client devices 104, 106. The online conference 112, for example, may be configured as a web conference, online meeting, webinar, and so forth. The client devices 104 and 106 each include a communication module 312, 134, to communicate with other client devices and with the conference system 102 during the online conference 112, such as to send audio and presentation content, receive audio and presentation content, receive sign language content, communicate via a chat box, and so forth.

A user interacting with client device 104, for instance, may provide a user input through interaction with a user interface 114 of a conference presenter module 116 (e.g., mobile application, third-party browser plug-in, etc.) to initiate the online conference 112. This may include specifying a time at which the online conference 112 is to begin and end, attendees that are permitted to join the online conference 112 (e.g., a user of client device 106), a title and subject matter of the online conference, and so forth.

The conference manager module 110, upon receipt of data corresponding to the user input, is configured to initiate the online conference 112 as instructed. A user of client device 106, for instance, may interact with a user interface 118 output by a conference viewer module 120 to join the online conference 112. This may include selection of a secure (e.g., obscured) link, provision of user credentials, download of the conference viewer module 120 for execution within a browser, and so forth. The conference system 102 may then manage the online conference 112, such as to serve as an intermediary for communications between the client devices 104, 106. In another example, functionality of the conference system 102 is implemented in whole or in part through use of the conference presenter module 116 and the conference viewer module 120, such as to support a peer-to-peer network, direct communication between the client devices 104, 106 via the network 108, and so forth.

The online conference 112, as previously described, is typically configured to provide an immersive and interactive experience. To do so, the user interfaces 114, 118 output by the conference presenter module 116 and the conference viewer module 120, respectively, include options corresponding to the online conference. For example, the conference presenter module 116 and the conference viewer module 120 include options for users of the respective client devices 104, 106 to select an avatar or digital image to be displayed in the user interfaces 114, 118 of the online conference. Upon selection of an avatar by a user of the client device 104, the avatar will be displayed at the other client devices participating in the online conference 112 in association with the user of the client device 104. Similarly, upon selection of an avatar by a user of the client device 106, the avatar will be displayed at the other client devices participating in the online conference 112 in association with the user of the client device 106.

Additionally, the conference viewer module 120 includes options in the user interface 118 to request accommodations for the online conference 112, such as sign language content corresponding to audio content of the online conference. A user interacting with client device 106, for instance, may provide a user input through interaction with the user interface 118 of the conference viewer module 120 to request sign language content corresponding to audio content of the online conference 112.

The conference manager module 110 is illustrated as including an accessibility module 122 implemented at least partially in hardware of a computing device to provide synchronized accessibility to client devices in the online conference 112. Upon receipt of data corresponding to the user input, the accessibility module 122 generates sign language content and synchronizes the sign language content with the presentation content of the online conference as described above and below. The accessibility module 122 accesses a translation library 124 maintained in storage 126 (e.g., a database or other type of storage device or computer-readable storage medium as described further in relation to FIG. 7) of the conference system 102 to translate audio content of the online conference 112 to sign language. The translation library 124 includes words and phrases from a spoken language along with sign language signs that correspond to the words and phrases of the spoken language to generate sign language content synchronized with presentation content of the online conference 112.

In one example, the accessibility module 122 causes an avatar selected by a presenter at the client device 104 to use the translation library 124 to translate the presenter's audio content in real time. The accessibility module 122 then provides the sign language content as presented by the presenter's avatar to a viewer at the client device 106 who requested the sign language content. In this way, the viewer at the client device 106 receives sign language content in real time and synchronized with visual presentation content, which is also personalized using the presenter's selected avatar.

The conference manager module 110 is also illustrated as including a device manager module 128. The device manager module 128 is implemented at least partially in hardware of a computing device to provide appropriate options and content to participants of the online conference. For instance, the device manager module 128 determines which devices participating in the online conference will receive presentation content and audio content, and which devices participating in the online conference will receive presentation content, audio content, and sign language content.

A user of the client device 106, for instance, may interact with a user interface 118 to pre-register client devices as associated with a user account of the user with the conference system 102. Device registration data 130 is then maintained in the storage 126 by the conference system 102 that is associated with this registration. The device registration data 130, for instance, may include data usable by the device manger module 128 to automatically provide sign language content with presentation content during the online conference 112. In one example, the device manager module utilizes the device registration data 128 to provide sign language content synchronized with presentation content automatically to a particular user's device at the beginning of an online conference, without requiring the user to request the synchronized sign language content.

The sign language content as synchronized with the presentation content is output by the conference manager module 110, such as to the client device 106 that requested the sign language content as part of the online conference 112. Alternatively or additionally, the conference manager module 110 can store a version of the online conference 112 that includes the sign language content as synchronized with the presentation content in the storage 126 for subsequent access by additional devices. The conference system 102 can make the online conference 112, including the sign language content synchronized with the presentation content, available to additional devices, for example additional client devices via the network 108, e.g., part of a subscription-based service.

Figure 2:
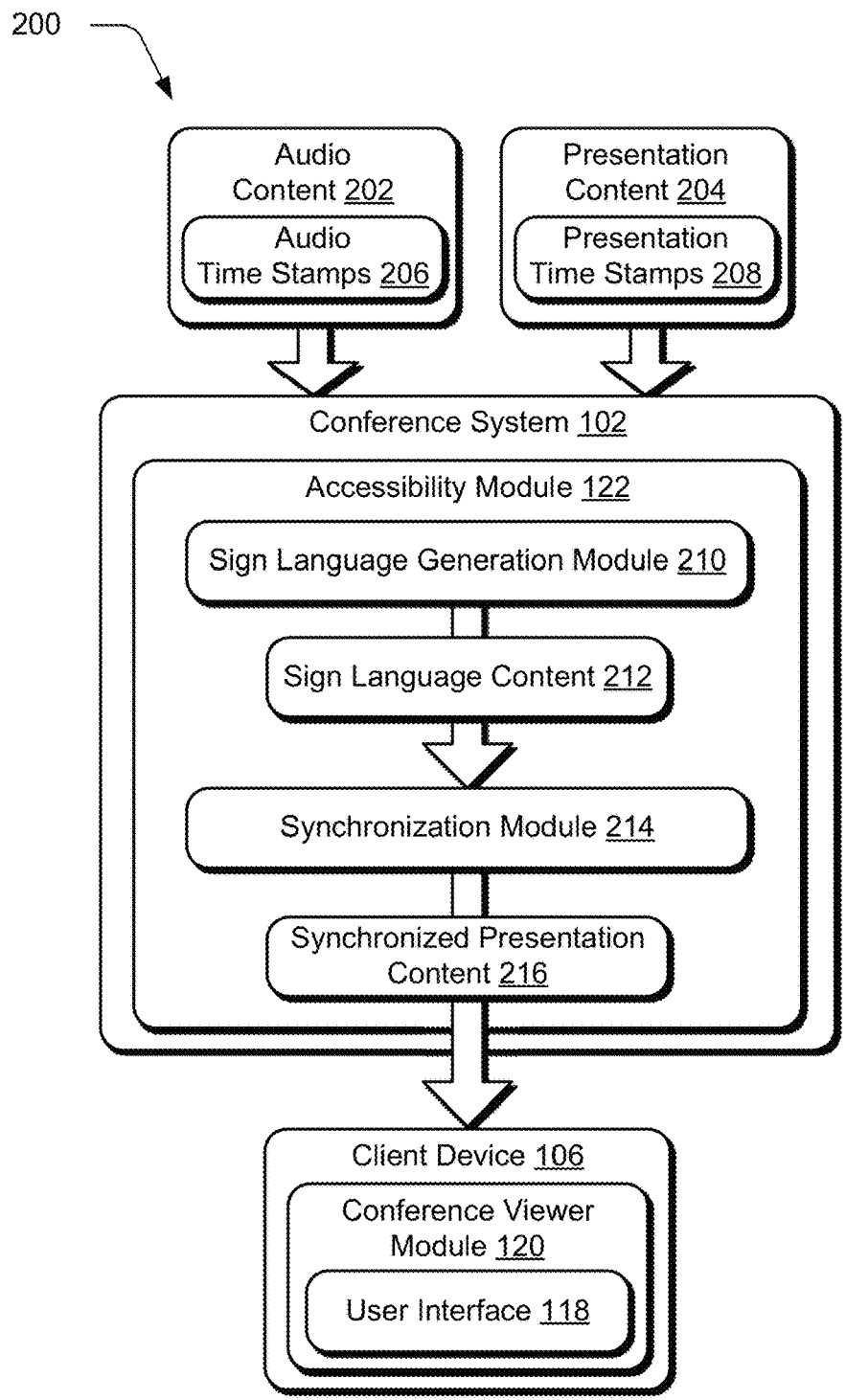
FIG. 2 depicts a system in an example implementation showing operation of an accessibility module of FIG. 1 in greater detail.

FIG. 2 depicts a system 200 in an example implementation showing operation of the accessibility module 122 of FIG. 1 in greater detail. To begin this example, the accessibility module 122 receives audio content 202 and presentation content 204, such as from the conference presenter module 116 of the client device 104 as described above. In this example, the audio content 202 includes audio time stamps 206, which are indications of time during an audio recording that indicate where a particular component of the audio is located. The audio time stamps 206 can be inserted using markers in an audio recording, or can be placed into a written transcription of an audio recording, to name a few examples. For instance, in an audio transcription, time stamps can be inserted at regular intervals (e.g., every minute, every 30 seconds, and so on), at locations of the audio recording where speakers change, at locations of the audio recording where presentation content such as a slide changes, and so forth.

Additionally, the presentation content 204 includes presentation time stamps 208, which are indications of time during a presentation recording that indicate where a particular component of the presentation is located. The presentation time stamps 208 can be inserted using markers in a video recording, such as when a slide of a presentation changes, when a scene of the video recording changes, at regular intervals (e.g., every minute, every 30 seconds, and so on), at commercial breaks during the video recording, and so forth.

In this example, the audio content 202 and the presentation content 204 are divided into segments, with an audio time stamp 206 and a presentation time stamp 208 at each segment. In this way, at least some of the audio time stamps 206 correspond to at least some of the presentation time stamps 208 where the audio content 202 and the presentation content 204 are divided into segments. For instance, consider an online conference that includes a slide presentation as the presentation content 204 with a speaker describing the slide presentation as the audio content 202. Each slide of the slide presentation represents a segment of the audio content 202 and the presentation content 204. The presentation content 204 in this instance includes presentation time stamps 208 that correspond to a slide of the slide presentation changing at the indicator of the segment. Additionally, the audio content 202 also includes audio time stamps 206 that correspond to the slide of the slide presentation changing at the indicator of the segment. Other examples of corresponding time stamps between the audio content 202 and the presentation content 204 are also contemplated.

A sign language generation module 210 receives the audio content 202 and translates the audio content to sign language using the translation library 124 described above. The sign language generation module 210 parses the audio content 202 into words and/or phrases and translates the words and phrases into sign language content 212 based on the translations in the translation library 124. Consequently, the sign language content 212 includes a stream of sign actions representing the received audio content 202. The sign language generation module 210 can utilize a variety of techniques and/or applications for translating the words and phrases to sign language, such as hidden Markov models (HMMs), dynamic time warping (DTW), neural networks, end-to-end automatic speech recognition, and so forth.

Additionally, the sign language generation module 210 assigns time stamps to segments of the sign language content 212 and includes the time stamps in the sign language content 212. The sign language generation module 210 assigns the time stamps to the sign language content 212 based on the audio time stamps 206 of the translated words and/or phrases of the audio content 202. For example, where the audio content 202 includes audio time stamps 206 for each spoken word, the sign language generation module 210 assigns the time stamp for each spoken word to the sign action for the corresponding word. In another example, where the audio content 202 includes audio time stamps 206 at ten second intervals, the sign language generation module 210 assigns the time stamp to the sign action corresponding to the word spoken at the ten second intervals. Accordingly, the sign language generation module 210 assigns a time stamp to sign actions in the sign language content 212 based on the time of the corresponding spoken words in the audio content 202, rather than based on a duration of the sign language content itself. Because at least some of the audio time stamps 206 occur at segments of the audio content 202 as discussed above, the corresponding sign actions in the sign language content 212 include the same time stamp at the segment as the audio time stamp for the spoken word.

Next, a synchronization module 214 generates synchronized presentation content 216 by synchronizing the sign language content 212 with the presentation content 204. The synchronization module 214 synchronizes the sign language content 212 with the presentation content 204 based on differences in durations of segments of the audio content 202 from durations of corresponding segments of the sign language content. As discussed above, at least some of the audio time stamps 206 and presentation time stamps 208 correspond to segments of the audio content 202 and the presentation content 204. Recall that the sign language content 212 includes time stamps that are assigned to sign actions based on the time of the corresponding spoken words in the audio content 202, rather than the sign language itself. Therefore, the synchronization module 214 aligns the time stamps included in the sign language content 212 with the presentation time stamps 208 to ensure that the subject matter from the audio content 202 properly aligns with the presentation content 204 when displayed to a user.

The synchronization module 214 is configured to remedy problems arising from the sign actions in the sign language content 212 being different durations than the words spoken in the audio content 202. For instance, to accommodate the difference in durations, the synchronization module 214 can add a delay to segments of the presentation content 204, pause the presentation content before beginning the next segment, provide a notification to a presenter of a live conference to slow down to accommodate the sign language generation, and so forth. In a case where the presentation content 204 is augmented to accommodate the different duration of the sign language content 212, such as pausing the presentation before beginning a next segment, the synchronized presentation content 216 includes these augmentations for subsequent viewers.

Once the sign language content 212 is synchronized with the presentation content 204, the synchronized presentation content 216 is output to the client device 106. The client device 106 can then present the synchronized presentation content 216 in the user interface 118 of the conference viewer module 120. For example, the synchronized presentation content 216 includes an avatar selected by the presenter of the online conference 112, which executes the sign actions of the sign language content as synchronized with the presentation content 204. In this way, the user of the client device 106 receives an immersive conference experience that maintains coordination between the subject matter spoken by the presenter, although presented in sign language, with the visual subject matter of the presentation content.

While the system 200 describes the accessibility module 122, including the sign language generation module 210 and the synchronization module 214, being located at the conference system 102, one or more of these modules 122, 210, 214 may also exist at the client device 106. For example, the sign language generation module 210 along with the translation library 124 may be located at the client device 106 to facilitate translation of the audio content 202 to sign language. Alternatively or additionally, the synchronization module 214 may be located at the client device 106 to synchronize the sign language content 212 with the presentation content 204, such as to account for network latency.

Figure 3:
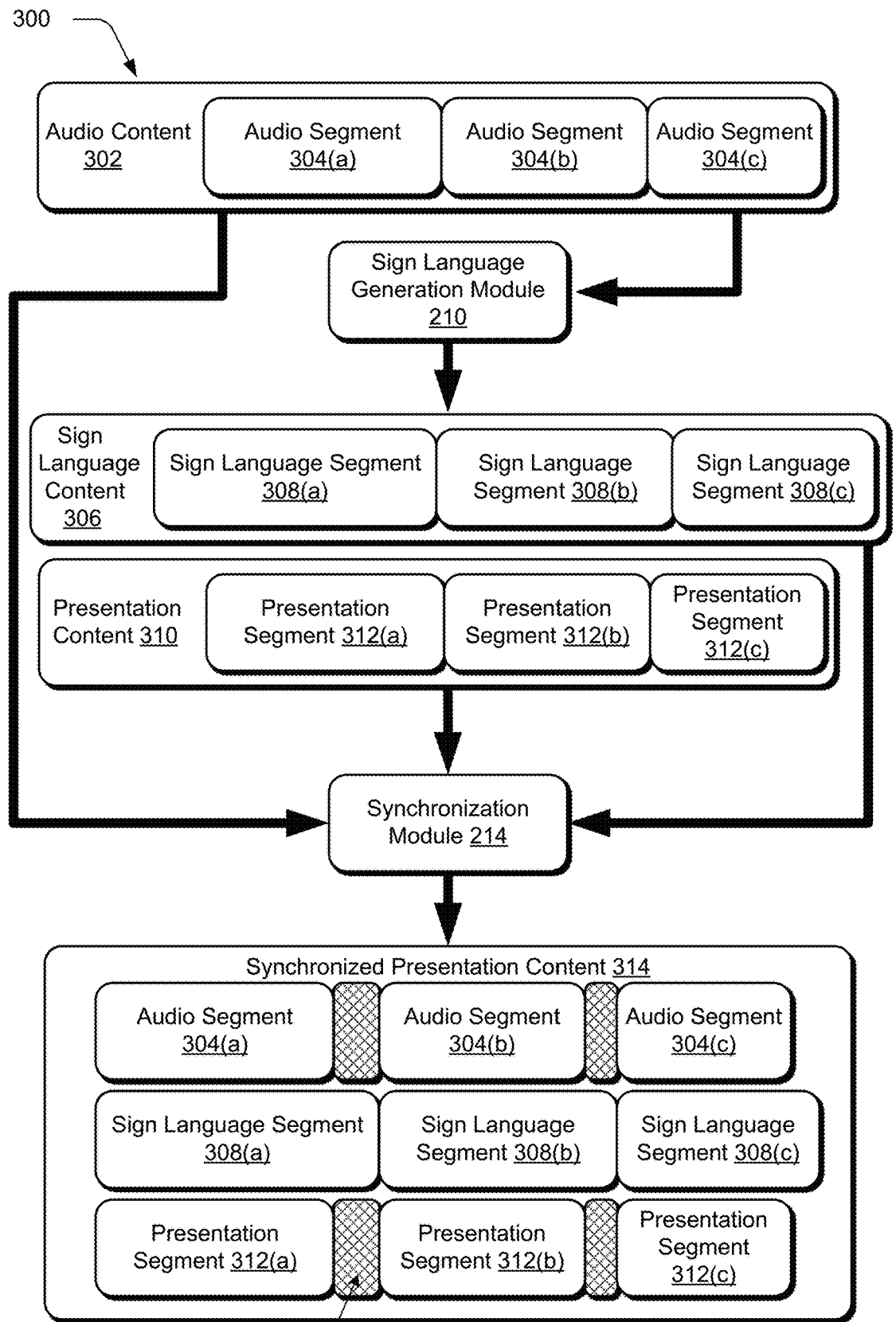
FIG. 3 depicts a system in an example implementation showing operation of a synchronization module of FIG. 2 in greater detail.

Turning now to FIG. 3, a system 300 is depicted in an example implementation showing operation of the synchronization module 214 of FIG. 2 in greater detail. To begin this example, the sign language generation module 210 receives audio content 302 as described above, such as from the conference presenter module 116 of the client device 104 via the network 108. The audio content 302 includes audio segments 304(a)-(c), which represent portions of the audio content such as descriptions of different slides in a slide presentation, different speakers in the audio content, different items of content (i.e., desired video versus advertisements, different scenes in a video, and so on), different content within a presentation (i.e., software demonstration to video to slideshow), individual words or phrases spoken by a presenter, and so forth. The audio content 302 in this example includes time stamps at least at the intersections between segments, although the audio content may include additional time stamps as well.

When the sign language generation module 210 receives the audio content 302, the sign language generation module generates sign language content 306 using the techniques described above. For example, the sign language generation module 210 assigns time stamps to sign actions in the sign language content 306 based on the time of the corresponding spoken words in the audio content 302, rather than based on a duration of the sign language content itself. Like the audio content 302, the sign language content 306 includes sign language segments 308(a)-(c). The sign language generation module 210 includes time stamps at the intersections between the sign language segments 308(a)-(c) based on the time of the corresponding intersection of segments in the audio content 302, rather than based on a duration of the sign language segments themselves.

Next, the synchronization module 214 receives the audio content 302, the sign language content 306, and presentation content 310 that includes a visual component of the online conference as described above. The presentation content also includes presentation segments 312(a)-(c). The presentation segments 312(a)-(c) represent the same portions of content as the audio segments 304(a)-(c), such as descriptions of different slides in a slide presentation, different speakers in the audio content, different items of content (i.e., desired video versus advertisements, different scenes in a video, and so on), different content within a presentation (i.e., software demonstration to video to slideshow), individual words or phrases spoken by a presenter, and so forth. Additionally, the presentation segments 312(a)-(c) include time stamps at least at the intersections between segments, coinciding with the time stamps at the intersections between the audio segments 304(a)-(c) of the audio content 302.

The synchronization module 214 is configured to synchronize the sign language content 306 with the presentation content in a variety of ways, based on a context of a particular online conference. In one example, the synchronization module 214 takes into consideration the time it takes for the sign language generation module 210 to convert an individual audio segment 304(a) into a sign language segment 308(a). The synchronization module 214 also takes into consideration the amount of time to present the audio segment 304(a), such as through speakers or headphones, compared to the amount of time to present the sign language segment 308(a), such as in a user interface with an avatar. Therefore, the synchronization module 214 can utilize the following equation to synchronize each of the sign language segments 308(a)-(c) with each of the audio and presentation segments 304(a)-(c), 312(a)-(c):

$$D_t = T1^i + (T3^i - T2^i)$$

Where $D_t$ is the total duration difference between a sign language segment and the corresponding presentation and audio segments, $T1^i$ is an amount of time taken to convert an audio segment to sign language, $T2^i$ is a duration of an audio segment as presented to viewers of the online conference, and $T3^i$ is a duration of the corresponding sign language segment as presented to viewers of the online conference. The synchronization module 214 determines duration differences for all, or multiple, of the audio segments 304(*a*)-(*c*) and sign language segments 308(*a*)-(*c*) of the audio content 302 and sign language content 306.

After determining the duration differences between the sign language segments 308(*a*)-(*c*) and the audio segments 304(*a*)-(*c*), the synchronization module 214 generates synchronized presentation content 314 that includes the sign language content 306 as synchronized with the presentation content 310. To do so, the synchronization module 214 adjusts the presentation content 310 based on a difference in the duration of the presentation segments 312(*a*)-(*c*) and the sign language segments 308(*a*)-(*c*). The synchronization module 214 may also adjust the audio content 302 based on a difference in the duration of the audio segments 304(*a*)-(*c*) and the sign language segments 308(*a*)-(*c*). Adjusting the presentation content 310 and the audio content 302 can include adding a delay to the presentation and audio segments, pausing the presentation and audio segments, playing the presentation and audio segments at a slower rate, playing the presentation and audio segments at a faster rate, and so forth.

The synchronized presentation content 314 is shown as including a delay 316 interspersed between the audio segments 304(*a*)-(*c*), and the presentation segments 312(*a*)-(*c*), to account for the time difference between the sign language segments 308(*a*)-(*c*) and the audio and presentation segments. In this way, the audio segment 304(*b*) and the presentation segment 312(*b*) begin at the same time as the sign language segment 308(*b*), accounting for extra time to generate and display the previous sign language segment 308(*a*). Similarly, the audio segment 304(*c*) and the presentation segment 312(*c*) begin at the same time as the sign language segment 308(*c*), again accounting for extra time to generate and display the previous sign language segment 308(*b*). The delay 316 ensures that the presentation segments, such as a slide, correspond with subject matter in both the audio segment describing the slide and the sign language translation of the audio segment in a sign language segment for the slide.

The synchronized presentation content 314, including the sign language segments 308(*a*)-(*c*) and the information to synchronize the sign language segments with the presentation segments 312(*a*)-(*c*) (i.e., delay or pause data), can be stored with the presentation content 310. This allows users who wish to view the online conference after it is recorded to consume the content of the online conference, including the sign language content 306 of the synchronized presentation content 314 if desired, without a delay to account for generation of the sign language content. Additionally, storing the sign language segments 308(*a*)-(*c*) and the information to synchronize the sign language segments with the presentation segments allows users to rewind or fast forward either the sign language content 306 or the presentation content 310. After the user concludes a rewind or fast forward, the sign language content 306 and the presentation content 310 play in sync based on the information to synchronize the sign language segments with the presentation segments, with the appropriate sign language content that corresponds to the presentation content being displayed.

For instance, if a viewer wants to rewind to the previous slide of a slide presentation in a recorded online conference, the viewer can rewind the presentation content 306 to the beginning of the previous slide. Using the information to synchronize the sign language segments with the presentation segments, the synchronization module 214 initiates the sign language content 306 with the presentation content 310 at the beginning of the description of the previous slide. On the other hand, if the viewer wants to rewind to view sign language actions of the sign language content 306 that he recently missed viewing, the viewer can rewind the sign language content to the correct location. Using the information to synchronize the sign language segments with the presentation segments, the synchronization module 214 displays the corresponding presentation content 310 at the designated sign language location.

In another example, the online conference is presented in real time to viewers. The synchronization module 214 identifies the context of the online conference as being presented in real time, and begins to synchronize the sign language content 306 with the presentation content 310. To do so, the synchronization module 214 again synchronizes the sign language content 306 with the presentation content 310 based on differences in durations of the audio segments 304(*a*)-(*c*) from durations of the corresponding sign language segments 308(*a*)-(*c*). This may include inserting delays into the presentation content 310 or pausing the presentation content to account for additional time required to generate and present the sign language content 306 to a viewer of the online conference, as described above.

Although synchronizing the sign language content 306 with the presentation content 310 improves the experience of viewers with physical disabilities during the online conference, in a real time conference scenario other features of the online conference may not align with the synchronized sign language content and presentation content. For instance, many online conferencing systems include a chat box that allows participants of the online conference to enter text to communicate with one another, ask questions of the presenter, and so forth. When the presentation content 310 is delayed to account for synchronization with the sign language content 306, a viewer receiving the synchronized presentation content 314 likely will not receive communications in a chat box that correspond to the synchronized content that the viewer is currently viewing.

Understanding that the online conference is occurring in real time, the synchronization module 214 can inform a presenter of the online conference to adjust the speed of his presentation to account for the differences in durations of the sign language segments 308(*a*)-(*c*) from the durations of the presentation and audio segments 304(*a*)-(*c*), 312(*a*)-(*c*). The presenter notification can include a pop-up window, a visual timing comparison between the sign language content 306 and the real time audio content 302 and/or the presentation content 310, a non-modal notification, an audible notification, a haptic notification, and so forth. Giving a presenter a notification to adjust timing of his or her presentation in real time improves the overall experience of all conference participants, allowing them to collaborate during the online conference while consuming the same presentation content regardless of disability.

Figure 4:
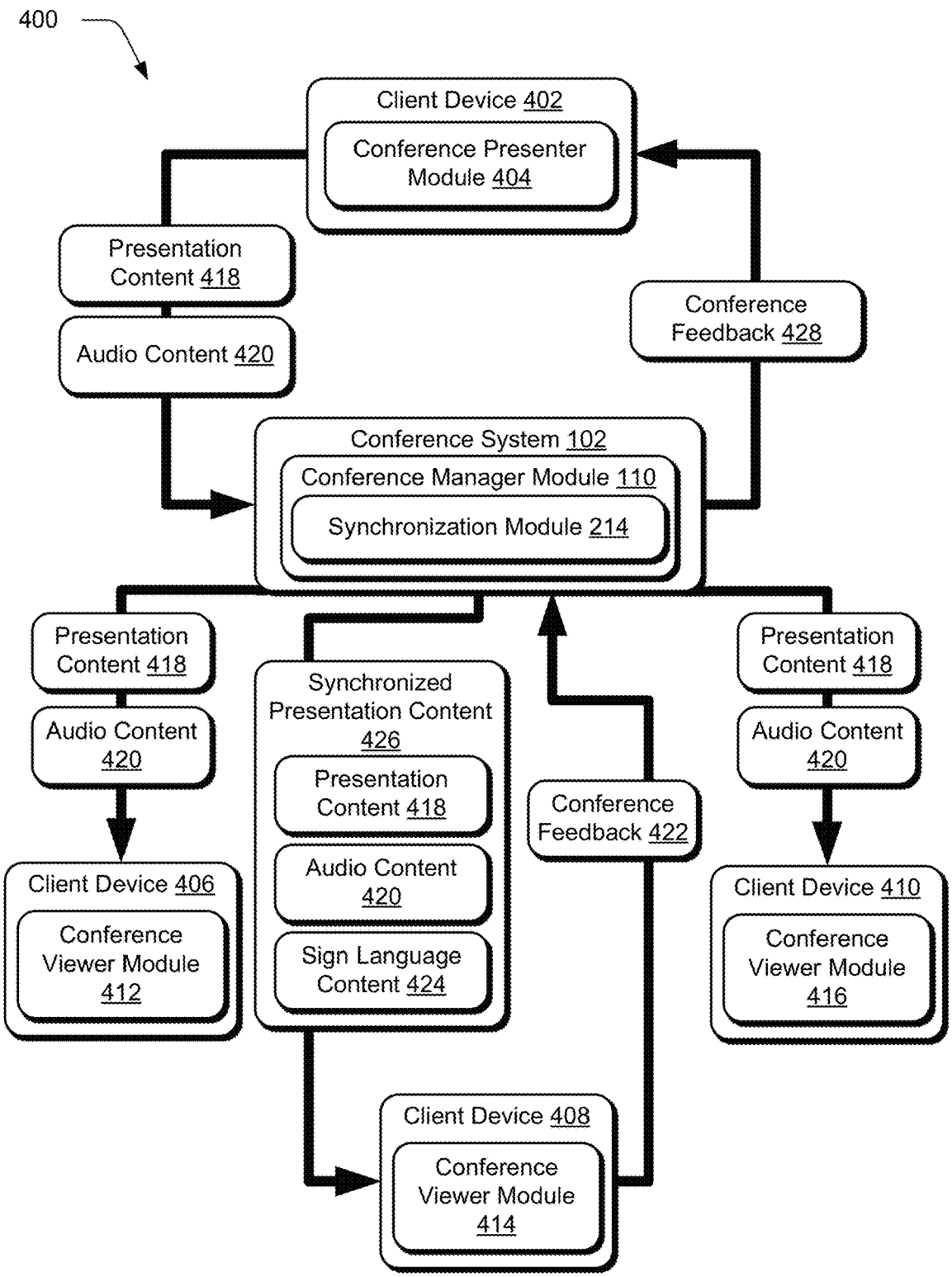
FIG. 4 depicts a system in an example implementation showing operation of a conference system including presenting synchronized presentation content to selected client devices utilizing the techniques described herein.

Turning now to FIG. 4, a system 400 is depicted in an example implementation showing operation of the conference system 102 of FIG. 1, including presenting synchronized presentation content to selected client devices utilizing the techniques described herein. To begin, an online conference is initiated, such as by conference participants responding to an invitation to the online conference, logging in to the online conference with a username and password, and so forth. The conference participants can include one or more presenters and/or one or more viewers. In this example, a conference presenter utilizes client device 402 including a conference presenter module 404, which may include functionality described in relation to the client device 104 and conference presenter module 116 of FIG. 1. Additionally, conference viewers in this example utilize client devices 406, 408, and 410, which include conference viewer modules 412, 414, and 416, respectively. The client devices 406, 408, and 410 and accompanying conference viewer modules 412, 414, and 416 may include functionality described in relation to the client device 106 and the conference viewer module 120 of FIG. 1.

As part of the online conference, the conference presenter module 404 and/or the conference viewer modules 412, 414, 416 may present conference participants with an option to select and link an identifier such as a photograph, digital image, avatar, and so forth with their profile in the online conference. The identifier provides the conference participants with an indication of which of the other conference participants performed an action during the online conference, such as speaking during an audio conversation or entering text into a chat box.

When the online conference begins, a presenter utilizing the conference presenter module 404 of the client device 402 can begin displaying presentation content 418 and audio content 420 as described above. The conference presenter module 404 sends the presentation content 418 and the audio content 420 to the conference manager module 110 of the conference system 102. The conference manager module 110 then distributes the presentation content 418 and the audio content 420 to the conference viewer modules 412, 414, and 418 of the respective client devices 406, 408, 410.

In relation to the online conference, the conference manager module 110 may receive conference feedback 422 from the conference viewer module 414 of the client device 408 requesting accommodations for the online conference. For instance, the conference feedback 422 is sent in response to a selection in a user interface of the conference viewer module 414, automatically when the online conference begins based on a user profile of the viewer that indicates the viewer desires accommodations for online conferences, and so forth. The conference feedback 422 in this example indicates a request for sign language content to be presented concurrently with the presentation content 418 of the online conference.

In response to receiving the conference feedback 422 indicating the request for sign language content, the conference manager module 110 first generates sign language content 424 by converting audio in the audio content 420 to sign language, as described above. Then, the synchronization module 214 of the conference manager module 110 generates synchronized presentation content 426 by synchronizing the sign language content 424 with the presentation content 418 based on differences in durations of segments of the audio content 420 from durations of corresponding segments of the sign language content, also described above. The conference manager module 110 outputs the synchronized presentation content 426 to the conference viewer module 414 of the client device 408.

When the conference viewer module 414 of the client device 408 receives the synchronized presentation content 426, a user interface of the conference viewer module displays the sign language content 424 as synchronized with the presentation content 418. To do so, the conference viewer module 414 can cause an avatar selected by the presenter of the online conference to become animated in the user interface, and execute the sign language content as though the presenter herself was executing the online conference in sign language. Alternatively, the conference viewer module 414 can present a default avatar to execute the sign language content, an avatar selected by the viewer of the client device 408 to execute the sign language content, and so forth.

Meanwhile, the client devices 406 and 410 continue to receive the presentation content 418 and the audio content 420 without disruption as the online conference proceeds. As discussed above, the synchronization module 214 of the conference manager module 110 can determine a context of the online conference and respond to events during the online conference according to the determined context. In one example, the synchronization module 214 can determine that the online conference was previously recorded (i.e., not happening in real time). The synchronization module 214 determines, based on this context, that no coordination is needed between the client devices 406, 408, and 410 who are viewing the online conference. Based on the context, the synchronization module 214 also inserts delays or pauses the presentation content 418 as needed for synchronization with the sign language content 424, knowing that the synchronized presentation content 426 does not need to correlate with the other client devices 406, 410.

In another example, the synchronization module 214 can determine that the online conference is happening in real time. The synchronization module 214 determines, based on this context, that the online conference should be coordinated between the client devices 402, 406, 408, 410 participating in the online conference. In a real time online conference scenario, the synchronization module 214 can ensure that each of the viewing participants at the client devices 406, 408, 410 receive the presentation content 418, the audio content 420, and/or the synchronized presentation content 426 at the same or similar time.

To do so, the synchronization module 214 determines if and when the presentation content 418 and the audio content 420 are separated from the display of the synchronized presentation content 426, such as by comparing the difference to a threshold amount of time (e.g., five seconds, 30 seconds, one minute, etc.). If the difference between display of the presentation content 418 and the audio content 420 and display of the synchronized presentation content 426 exceeds the threshold, the conference manager module 110 can output conference feedback 428 to the conference presenter module 404 as described above. This alerts the presenter utilizing the client device 402 to alter the speed of the presentation content 418 and the audio content 420 so that all of the conference participants are receiving the content at the same or similar time, allowing them to interact during the conference with dialogue, in a chat box, and so forth.

Figure 5:
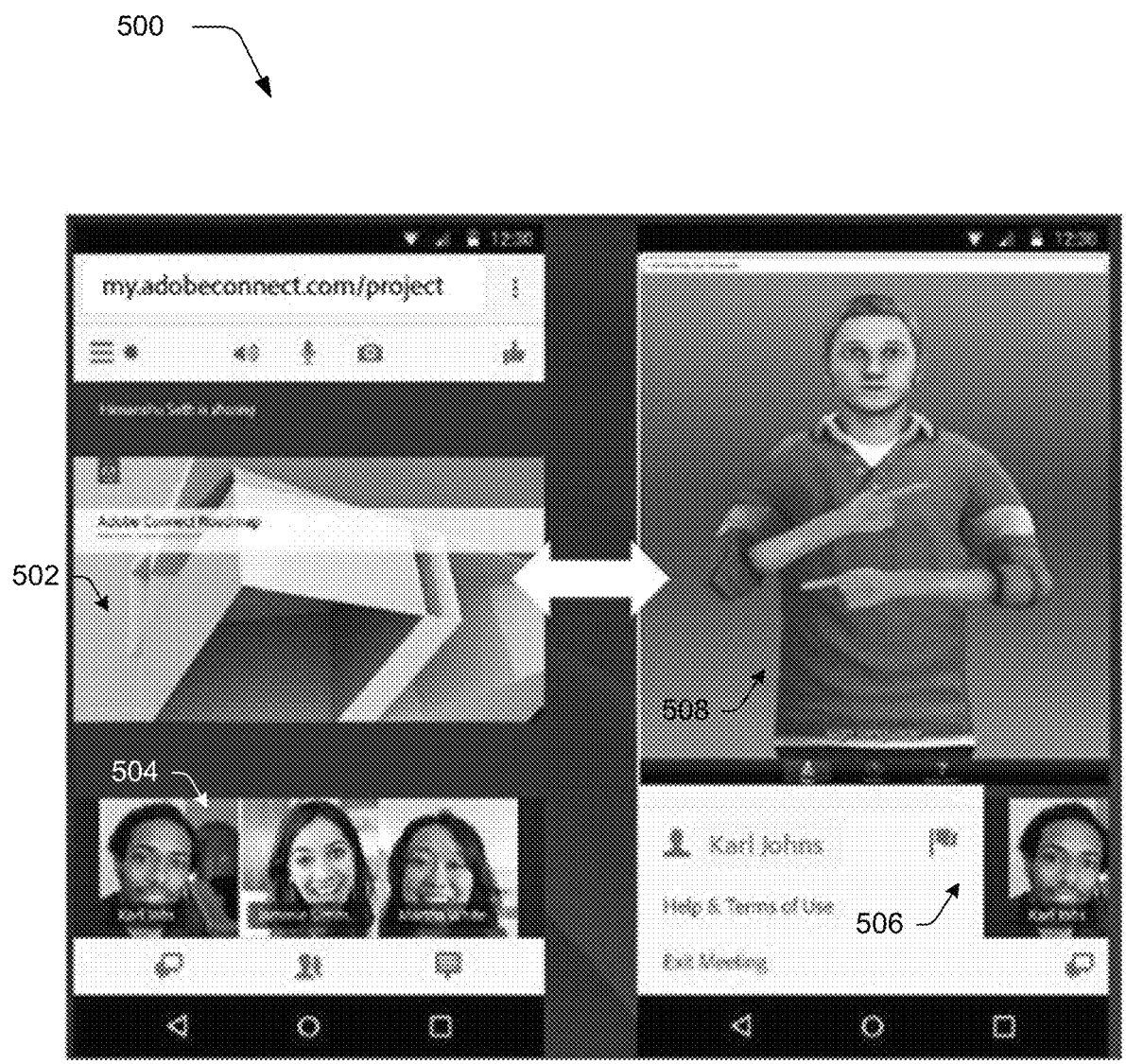
FIG. 5 depicts an example implementation showing a user interface that is output to a client device in an online conference utilizing the techniques for synchronized presentation content as described herein.

Next, consider FIG. 5, which depicts an example implementation showing a user interface 500 that is output to a client device in an online conference utilizing the techniques for synchronized sign language and presentation content as described herein. The user interface 500 contains various portions, including presentation content 502. The presentation content 502 in this instance is a slide presentation, but may also include a software demonstration, a video, a screen share, and so on. A second portion of the user interface 500 includes indicators 504 of other online conference participants, giving a user of the client device that is outputting the user interface a visual representation of the other participants in the online conference. Another portion of the user interface 500 includes an indicator of the presenter 506 of the online conference, such as the presenter's name and a photograph of the presenter.

The user interface 500 also includes a sign language portion 508, which is displayed in response to a request by a user of the client device that is outputting the user interface. The sign language portion 508 displays an avatar executing sign actions that correspond to the audio of the online conference. The sign actions executed by the avatar in the sign language portion 508 are synchronized with the presentation content 502 using the techniques described herein. For instance, the synchronization module 214 generates synchronized presentation content 216 that includes sign actions to be executed by the avatar in the sign language portion of the user interface 500. The synchronized presentation content 216 can include a delay or pause to ensure that the sign language content executed by the avatar in the sign language portion 508 of the user interface 500 is synchronized with the presentation content 502, for example. The user interface 500 provides but one example of possible interfaces for users who request sign language as part of an online conference that gives the users an immersive and cohesive online conference experience.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
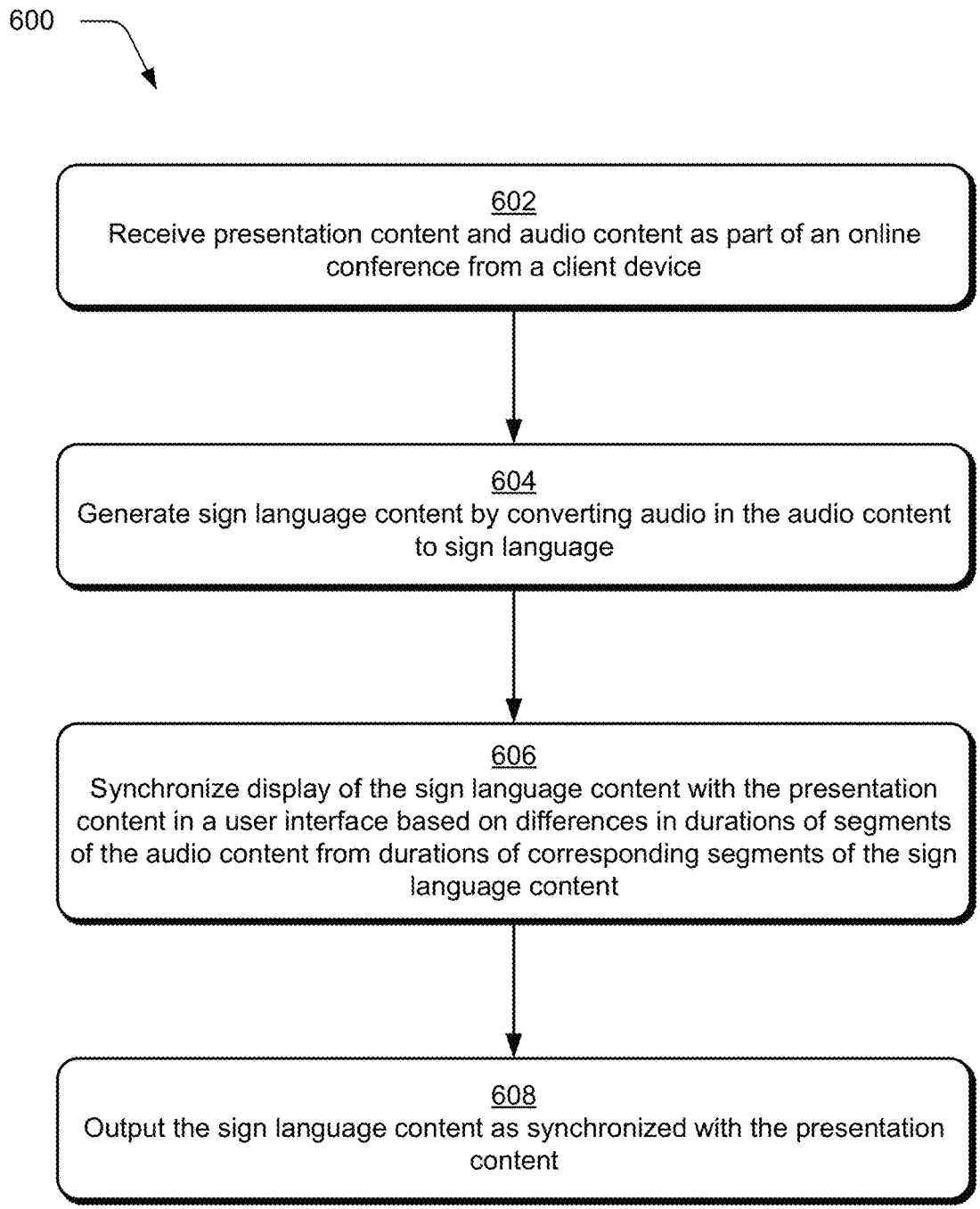
FIG. 6 is a flow diagram depicting a procedure in an example implementation in which presentation content is synchronized with sign language content in an online conference collaboration system.

FIG. 6 depicts a procedure 600 in an example implementation in which sign language content is synchronized with presentation content of an online conference in a conferencing system of a digital medium environment. First, presentation content and audio content are received as part of the online conference from a client device (block 602). The presentation content is a visual component of the online conference, such as a slide presentation, a software demonstration, a screen share, a video, and so forth. The audio content is audio to be played concurrently with the presentation content, such as a speaker describing the presentation content, music to accompany the presentation content, and so on. The client device from which the presentation content and the audio content are received may include a conference presenter module 116 configured to manage the online conference, such as initiating the online conference, granting permissions during the online conference, terminating the online conference, and so forth. The client device may alternatively include a conference viewer module 120 configured to view the online conference and make contributions to the online conference based on designated permissions, such as contributing to a discussion, asking a question, entering a chat in a chat box, and so on.

Sign language content is then generated by converting audio in the audio content to sign language (block 604). For instance, the accessibility module 122 accesses the translation library 124 to translate the audio content of the online conference to sign language. The translation library 124 includes words and phrases from a spoken language along with sign language signs that correspond to the words and phrases of the spoken language to generate sign language content for the online conference.

Display of the sign language content is synchronized with the presentation content in a user interface based on differences in durations of segments of the audio content from durations of corresponding segments of the sign language content (block 606). The synchronization module 214 can synchronize the sign language content with the presentation content using time stamps included with the audio content and included with the presentation content. In order to account for differences in the durations of the segments of the audio content from durations of corresponding segments of the sign language content, the synchronization module 214 can add a delay to the corresponding presentation content segments, pause the corresponding presentation segments, play the corresponding presentation segments at a slower or faster speed, and so forth.

Finally, the sign language content is output as synchronized with the presentation content (block 608). For instance, sign actions of the sign language content can be executed by an avatar selected by a presenter of the online conference at a conference viewer module of a client device to emulate the presenter giving the presentation in sign language. Alternatively or additionally, the sign language content as synchronized with the presentation content can be output to storage 126 for subsequent access by users who want to view the online conference with sign language. Storing the sign language content as synchronized with the presentation content gives viewers instant access to the synchronized presentation content, and allows for additional features such as fast-forwarding and rewinding of the content without parting from synchronization between the presentation content and the sign language content.

Using the techniques described herein, the experience of an online conference is enhanced for not only participants who desire accessibility accommodations, but all participants of the online conference. Presenting sign language content as synchronized with presentation content allows viewers to have an immersive and cohesive experience while viewing the online conference. Additionally, presenting sign language content as synchronized with presentation content using the techniques described herein allows both participants with accessibility accommodations, and those without, to interact during an online conference that is happening in real time while consuming the same content at the same time. Consequently, online conferences are more accessible and more effective at communicating to all participants regardless of a disability.

Example System and Device

Figure 7:
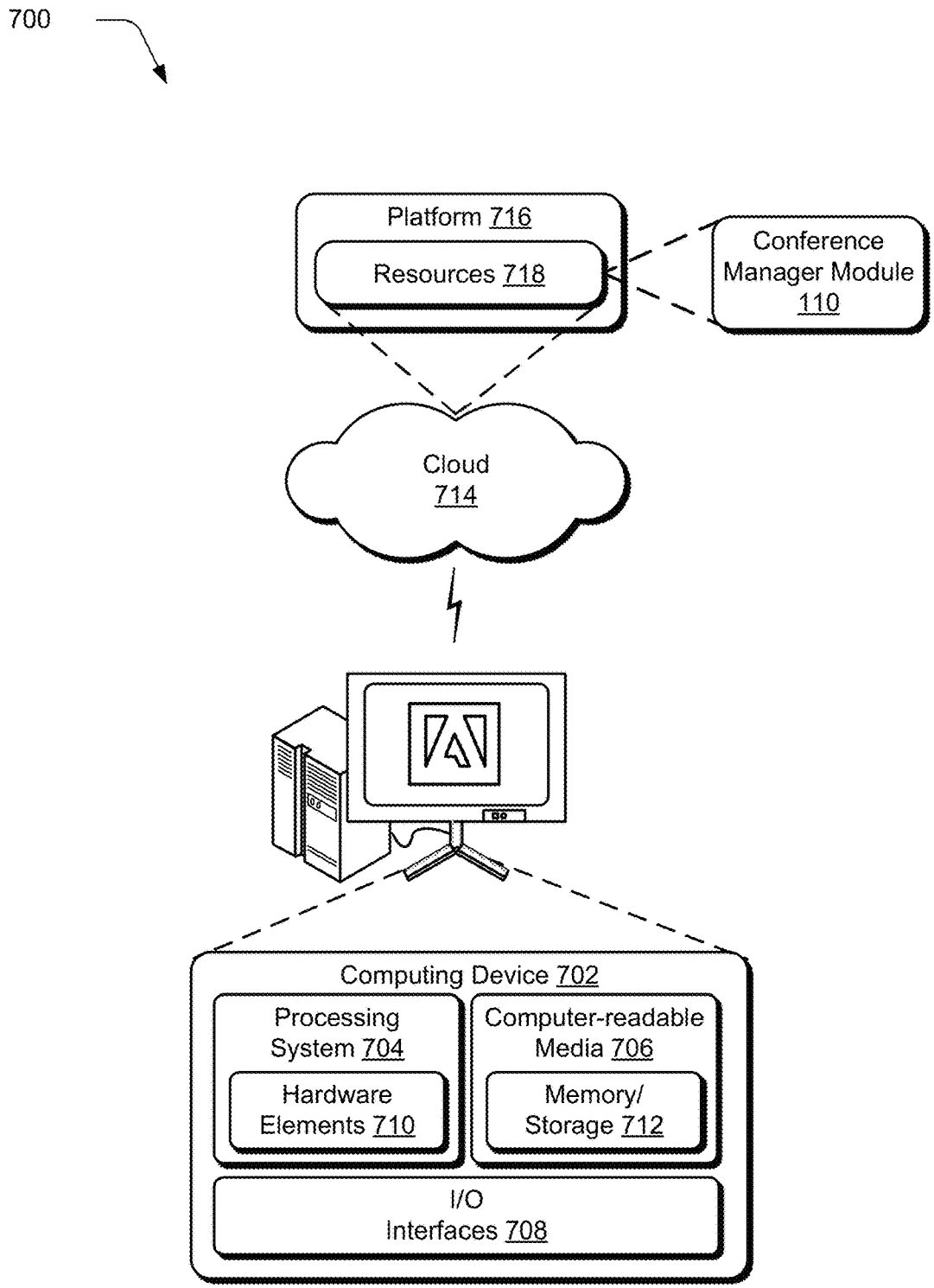
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the conference manager module 110. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
   receiving, by the at least one computing device, presentation content via a presentation stream and audio content via an audio stream, the presentation content having presentation time stamps synchronized with audio time stamps of the audio content;
   generating, by the at least one computing device, sign language content by converting audio in the audio content received via the audio stream into sign language;
   assigning, by the at least one computing device, the audio time stamps of the audio content as sign language time stamps to sign language segments of the sign language content;
   synchronizing, by the at least one computing device, the sign language content with the presentation content based on duration differences between the sign language segments and corresponding audio segments of the audio content; and
   outputting, by the at least one computing device, the sign language content as synchronized with the presentation content and including delays interspersed between the corresponding audio segments.

2. The method of claim 1, wherein the presentation stream and the audio stream are received via a network.

3. The method of claim 1, wherein synchronizing the sign language content with the presentation content includes adding a delay to the presentation content.

4. The method of claim 1, wherein generating the sign language content includes adding a delay to the sign language content.

5. The method of claim 1, wherein generating the sign language content includes using a translation library to convert words or phrases in the audio content into the sign language.

6. The method of claim 1, further comprising presenting a notification to adjust a speed of an online conference to account for duration differences between segments of the presentation content and corresponding segments of the sign language segments.

7. The method of claim 1, wherein generating the sign language content includes displaying an avatar to execute sign actions of the sign language.

8. The method of claim 1, further comprising storing the sign language content as synchronized with the presentation content for subsequent user access.

9. The method of claim 1, wherein the presentation content includes one or more of a slide presentation, a software demonstration, a video, or a screen share.

10. In a digital medium environment, a method implemented by at least one computing device, the method comprising:
    receiving, by the at least one computing device, presentation content via a presentation stream and audio content via an audio stream, the presentation content having presentation time stamps synchronized with audio time stamps of the audio content;
    generating, by the at least one computing device, sign language content by converting audio in the audio content using a translation library to convert words or phrases in the audio content to sign language;
    assigning, by the at least one computing device, sign language time stamps to sign language segments of the sign language content based on the audio time stamps;
    synchronizing, by the at least one computing device, the sign language content with the presentation content based on duration differences between the sign language segments and corresponding audio segments of the audio content; and
    outputting, by the at least one computing device, the sign language content as synchronized with the presentation content and including delays interspersed between the corresponding audio segments.

11. The method of claim 10, further comprising assigning time stamps to sign actions of the sign language based on times of the words or phrases in the audio content.

12. The method of claim 10, wherein synchronizing the sign language content with the presentation content includes adding a delay to the sign language content.

13. The method of claim 10, wherein synchronizing the sign language content with the presentation content includes adding a delay to the presentation content.

14. The method of claim 10, wherein the translation library includes spoken words and phrases from a spoken language along with sign language signs that correspond to the spoken words or phrases.

15. The method of claim 10, wherein the sign language content includes an avatar to execute sign actions of the sign language.

16. In a digital medium environment, a system comprising:
- means for receiving presentation content via a presentation stream and audio content via an audio stream, the presentation content having presentation time stamps synchronized with audio time stamps of the audio content;
- means for generating sign language content by converting audio in the audio content received via the audio stream into sign language;
- means for assigning the audio time stamps of the audio content as sign language time stamps to sign language segments of the sign language content;
- means for synchronizing the sign language content with the presentation content based on duration differences between the sign language segments and corresponding audio segments of the audio content; and
- means for outputting the sign language content as synchronized with the presentation content and including delays interspersed between the corresponding audio segments.

17. The system of claim 16, wherein the presentation stream and the audio stream are received separately via a network.

18. The system of claim 16, wherein synchronizing the sign language content with the presentation content includes adding a delay to the presentation content.

19. The system of claim 16, wherein synchronizing the sign language content with the presentation content includes adding a delay to the sign language content.

20. The system of claim 16, wherein generating the sign language content includes means for using a translation library to convert words or phrases in the audio content into the sign language.

* * * * *